(12) United States Patent
Kitaura et al.

(10) Patent No.: US 6,388,984 B2
(45) Date of Patent: *May 14, 2002

(54) OPTICAL INFORMATION RECORDING MEDIUM AND ITS RECORDING AND REPRODUCING METHOD

(75) Inventors: Hideki Kitaura, Kyoto; Noboru Yamada, Osaka; Ken'ichi Nagata, Hyogo; Kenichi Nishiuchi; Shigeaki Furukawa, both of Osaka, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/140,296

(22) Filed: Aug. 25, 1998

(30) Foreign Application Priority Data

Aug. 28, 1997 (JP) .............................. 9-232885
Aug. 10, 1998 (JP) ............................ 10-226270

(51) Int. Cl.$^7$ ................................ G11B 7/24
(52) U.S. Cl. ................... 369/275.4; 369/275.1
(58) Field of Search .................... 369/275.3, 275.4, 369/111, 44.26, 47, 288, 283, 284, 279

(56) References Cited

U.S. PATENT DOCUMENTS

| | | |
|---|---|---|
| 4,461,807 A | 7/1984 | Mori et al. |
| 4,606,018 A * | 8/1986 | Sugiki et al. ............... 369/279 |
| 4,637,976 A | 1/1987 | Terao et al. |
| 4,661,420 A | 4/1987 | Nakamura et al. |
| 4,670,345 A | 6/1987 | Morimoto et al. |
| 4,680,742 A | 7/1987 | Yamada et al. |
| 4,744,055 A | 5/1988 | Hennessey |
| 4,913,949 A | 4/1990 | Steininger et al. |
| 4,954,379 A | 9/1990 | Nishida et al. |
| 4,984,231 A | 1/1991 | Yasuoka et al. |
| 5,098,761 A | 3/1992 | Watanabe et al. |
| 5,108,846 A | 4/1992 | Steininger |
| 5,194,363 A | 3/1993 | Yoshioka et al. |
| 5,221,588 A | 6/1993 | Morimoto et al. |
| 5,283,133 A | 2/1994 | Tsutsumi et al. |

(List continued on next page.)

FOREIGN PATENT DOCUMENTS

| | | |
|---|---|---|
| EP | 0 375 700 | 7/1990 |
| EP | 0 499 273 A2 | 8/1992 |
| EP | 0 588 305 | 3/1994 |
| EP | 0 594 277 A1 | 4/1994 |
| EP | 0 837 017 | 2/1995 |
| EP | 0 644 537 A2 | 3/1995 |

(List continued on next page.)

OTHER PUBLICATIONS

The Merck Index, front cover, Merk Co., Inc.

*Primary Examiner*—Thang V. Tran
(74) *Attorney, Agent, or Firm*—Merchant & Gould, P.C.

(57) ABSTRACT

A reflectance increasing type optical information recording medium in which the crosstalk is inhibited in the land and groove recording. This optical information recording medium comprises a substrate having a groove and a land provided between adjacent grooves and a recording layer that is provided on the substrate and that changes the reflectance by irradiation with light beams. In this recording medium, the reflectance after recording is greater than the reflectance before recording. Moreover, the depth D of the groove is set to be in the range of $\lambda/8n$ to $3\lambda/8n$, where the wavelength of the light beam is $\lambda$ and the refractive index of the substrate is n. And the difference, $\Delta\phi=\phi_1-\phi_0$, between the phase $\phi_1$ of the reflected light after recording and the phase $\phi_0$ of the reflected light before recording is in the range of $(-0.1+2m)\pi$ to $(0.1+2m)\pi$, where m is an integer.

25 Claims, 3 Drawing Sheets

U.S. PATENT DOCUMENTS

| | | | |
|---|---|---|---|
| 5,289,453 A | 2/1994 | Ohno et al. | |
| 5,294,523 A | 3/1994 | Nagata et al. | |
| 5,395,689 A | 3/1995 | Kawahara et al. | |
| 5,395,735 A | 3/1995 | Nagata et al. | |
| 5,418,030 A | 5/1995 | Tominaga et al. | |
| 5,424,106 A | 6/1995 | Yamada et al. | |
| 5,431,978 A | 7/1995 | Nakamura et al. | |
| 5,442,619 A | 8/1995 | Van Uijen et al. | |
| 5,448,551 A | 9/1995 | Miyagawa et al. | |
| 5,459,019 A | 10/1995 | Kato et al. | |
| 5,484,686 A | 1/1996 | Maeda et al. | |
| 5,521,901 A | 5/1996 | Okada et al. | |
| 5,545,454 A | 8/1996 | Yamada et al. | |
| 5,580,632 A | 12/1996 | Ohkawa et al. | |
| 5,581,539 A | * 12/1996 | Horie et al. | 369/275.4 |
| 5,591,501 A | 1/1997 | Ovshinsky et al. | |
| 5,652,037 A | 7/1997 | Ohkawa et al. | |
| 5,726,969 A | 3/1998 | Moriya et al. | |
| 5,733,622 A | 3/1998 | Starcke et al. | |
| 5,745,475 A | 4/1998 | Ohno et al. | |
| 5,764,619 A | 6/1998 | Nishiuchi et al. | |
| 5,776,574 A | 7/1998 | Honguh et al. | |
| 5,787,061 A | 7/1998 | Tsuchiya et al. | |
| 5,811,217 A | 9/1998 | Akahira et al. | |
| 5,818,808 A | 10/1998 | Takada et al. | |
| 5,878,018 A | 3/1999 | Moriya et al. | |
| 5,882,759 A | 3/1999 | Hirotsune et al. | |
| 5,914,214 A | 6/1999 | Ohta et al. | |
| 5,958,649 A | 9/1999 | Hirotsune | |
| 5,976,659 A | 11/1999 | Abiko | |
| 6,004,646 A | * 12/1999 | Ohno et al. | 369/288 |
| 6,096,399 A | 8/2000 | Yoshinara | |
| 6,153,063 A | 11/2000 | Yamada et al. | |

FOREIGN PATENT DOCUMENTS

| | | |
|---|---|---|
| EP | 0 706 177 | 4/1996 |
| EP | 0 732 690 A1 | 9/1996 |
| EP | 0 825 595 | 2/1998 |
| EP | 0 849 729 A2 | 6/1998 |
| JP | 56-145530 | 11/1981 |
| JP | 57-50330 | 3/1982 |
| JP | 61-89889 | 5/1986 |
| JP | 62-196181 | 8/1987 |
| JP | 63-50931 | 3/1988 |
| JP | 63-63153 | 3/1988 |
| JP | 63-103453 | 5/1988 |
| JP | 63-151486 | 6/1988 |
| JP | 63-171453 | 7/1988 |
| JP | 1-211249 | 8/1989 |
| JP | 1-276453 | 11/1989 |
| JP | 2-037548 | 2/1990 |
| JP | 2-78041 | 3/1990 |
| JP | 2-105351 | 4/1990 |
| JP | 2-265051 | 10/1990 |
| JP | 2-265052 | 10/1990 |
| JP | 3-40244 | 2/1991 |
| JP | 3-104038 | 5/1991 |
| JP | 3-113844 | 5/1991 |
| JP | 3-248338 | 11/1991 |
| JP | 4-52188 | 2/1992 |
| JP | 4-069833 | 3/1992 |
| JP | 4-102243 | 4/1992 |
| JP | 4-143937 | 5/1992 |
| JP | 4-219650 | 8/1992 |
| JP | 4-321948 | 11/1992 |
| JP | 5-2769 | 1/1993 |
| JP | 5-62193 | 3/1993 |
| JP | 5-159360 | 6/1993 |
| JP | 5-217211 | 8/1993 |
| JP | 5-274726 | 10/1993 |
| JP | 5-282705 | 10/1993 |
| JP | 5-290408 | 11/1993 |
| JP | 5-298747 | 11/1993 |
| JP | 5-298748 | 11/1993 |
| JP | 5-325261 | 12/1993 |
| JP | 6-195747 | 7/1994 |
| JP | 7-21583 | 1/1995 |
| JP | 7-105574 | 4/1995 |
| JP | 7-326073 | 12/1995 |
| JP | 8-85261 | 4/1996 |
| JP | 8-190734 | 7/1996 |
| JP | 8-329528 | 12/1996 |
| JP | 8-329529 | 12/1996 |
| JP | 10-49916 | 2/1998 |
| JP | 4-78032 | 3/1999 |
| WO | WO 96/00441 | 1/1996 |

* cited by examiner

OPTICAL INFORMATION RECORDING MEDIUM AND ITS RECORDING AND REPRODUCING METHOD

FIELD OF THE INVENTION

The present invention relates to an optical information recording medium capable of recording and reproducing information at high speed and high density by using light beams, etc., and to a method for recording and reproducing information by using the optical information recording medium.

BACKGROUND OF THE INVENTION

Studies and developments have been conducted in the field of optical information recording media capable of recording and reproducing at high speed and high density. In the optical information recording medium, a thin film comprising a chalcogen material etc. provided on a substrate is locally heated by irradiation with laser beams. The thin film in the medium is able to change between an amorphous state and a crystalline state. The two states are different in the optical constants (refractive index n, extinction coefficient k) in accordance with irradiation conditions. And in the optical information recording medium, a signal is detected as a difference of an amount of the reflected light or an amount of the transmitted light with respect to the laser beams having a predetermined wavelength.

In such a phase change type recording, the laser beams are fluctuated between two levels, namely, the recording level and the erasing level, in accordance with the information signal and irradiated on the information track on the medium. Thus, a new signal can be recorded while erasing a previously recorded signal (Publication of Japanese Patent Application (Tokkai Sho) No. 56-145530). Since this method does not require parts of a magnetic circuit that are required in a magneto-optical recording, the head can be simplified. Moreover, since signals can be erased and recorded simultaneously, the rewriting time can be shortened. Consequently, this method is advantageous in recording information.

In order to realize a phase change recording at high density, in general, a smaller recording mark is formed by shortening the wavelength of the light source used for recording and by enhancing the NA (numerical aperture) of an objective lens. Thus, the linear density of the recording mark on the substrate in the circumference direction and the track density in the direction of the diameter are improved. Recently, a mark edge recording method has been dominant. In this method, the length of the recording mark contains information.

Furthermore, as one of the effective means for realizing a high density recording, a land & groove recording has been suggested. In this method, both a groove for guiding laser beams, which is provided on the substrate, and a land provided between the guiding grooves are used as information tracks (Publication of Japanese Patent Examined Application (Tokko Sho) No. 63-57859). However, in the land & groove recording, the track direction of the recording mark, namely, a pitch in the direction of the disc diameter, is almost half as that of the case where recording is performed on either a groove or a land. As a result, during reproducing, crosstalk often occurs. In other words, the signal of the recording mark of the track adjacent to the recording mark to be reproduced appears in a spot on which laser beams are converged. Thus, the quality of the reproduced signals is deteriorated.

In order to reduce the crosstalk, some methods have been disclosed. One of the methods so as to reduce the crosstalk without providing a particular signal proceeding circuit includes the steps of: approximately equalizing the width of a land and that of a groove; and setting the depth of the groove to be in the range of $\lambda/7n$ to $\lambda/5n$ ($\lambda$: wavelength of a laser beam, n: refractive index of the substrate material) (Publication of Japanese Patent Application (Tokkai Hei) No.5-282705, Tokkai Hei No. 6-338064)

Moreover, the reflectance and the phase of the reflected light change in accordance with the change of the state due to recording. According to some disclosures, it is also effective to specify the reflectance ratio or the phase difference so as to reduce the crosstalk. For example, $R_1$ and $R_2$ satisfy the relation: $0 \leq R_2/R_1 \leq 0.2$, when a higher reflectance in the reflectance before recording and the reflectance after recording is $R_1$, and a lower reflectance is $R_2$ (Publication of Japanese Patent Application (Tokkai Hei) No.7-287872); $R_1$ and $R_2$ satisfy the relation: $R_2/R_1 \leq 0.15$ and $10\% \leq R_1 \leq 40\%$ (Publication of Japanese Patent Application (Tokkai Hei) No.8-329529); and the phase difference $\Delta\phi$ satisfies the relation: $(m-0.1)\pi \leq \Delta\phi \leq (m+0.1\pi)$ [rad] (Publication of Japanese Patent Application (Tokkai Hei( No.8-329528).

All of the information recording media disclosed in the above mentioned Patent Applications are the reflectance reducing type recording media where the reflectance is reduced by recording. As a recording medium using the change of the reflectance, besides the reflectance-reducing type recording, there is a reflectance increasing type recording medium. In the land & groove recording, in general, the reflectance reducing type medium can easily reduce the crosstalk. The reflectance increasing type medium is disadvantageous in this respect. The reasons of this will be described as follows.

As described in Publication of Japanese Patent Application (Tokkai Hei) No.7-287872, when the reflectance is increased, the interference by the reflected lights between the adjacent tracks is increased. When the lower reflectance is brought closer to 0, the interference is reduced. Thus, even if the interference is great in the region where the reflectance is high, the optimization of the depth of the groove allows the change in the reflectance not to affect the adjacent tracks. In other words, as the lower reflectance is closer to 0, the crosstalk can advantageously reduced.

However, the reflectance before recording, namely, the reflectance of the base region other than the recording mark is desired to be high to some extent. In general, the necessary reflectance is said to be 10–15 % or more. The reason for this is as follows. (1) A sufficient amount of the reflected light from the recording medium is needed when the servo control such as focusing, tracking, etc. is performed on the recording medium. (2) A recording medium generally has a sector structure in which one circle of track is divided into some sectors and at the head of the sector on the substrate, concavities and convexities showing address numbers are provided. In order to detect its signal, a sufficient amount of the reflective light is needed.

From the above, in the case of the reflectance reducing type medium, if the reflectance after recording is brought closer to 0 while making the reflectance before recording great, the change in the reflectance can be increased, and in turn a sufficient signal strength can be obtained. In addition, the crosstalk can be reduced. On the other hand, in the case of the reflectance increasing type medium, if the reflectance before recording is sufficiently increased, the reflectance after recording is also required to be further increased so as to increase the change in the reflectance. Therefore, neither reflectance before recording nor reflectance after recording can be brought closer to 0. As a result, the reflectance increasing type medium is disadvantageous in terms of reducing crosstalk.

From the above mentioned reasons, all of the recording media disclosed in the above mentioned Patent Applications are reflectance reducing type media. Publication of Japanese Patent Application (Tokkai Hei) No.8-329529 also discloses the reflectance increasing type medium. However, the medium is described as a comparative embodiment where crosstalk is great. The reflectance increasing type medium having a reduced crosstalk is not disclosed.

As mentioned above, from the respect of the crosstalk, the reflectance increasing type recording medium is disadvantageous in realizing a high density recording. However, the reflectance increasing type medium has advantageous characteristics as a practical recording medium. Two of representative examples will be described hereinafter.

In the phase change recording medium, in general, the optical absorption rate is different between an amorphous region and a crystalline region and the crystalline region requires latent heat of melting. As a result, the temperature rising profile differs in the regions. Consequently, at the time of overwriting by laser beams, the shapes of the recording marks are subtly distorted according to the amount of overlap between new recording marks and previously recorded marks. Therefore, an error (jitter) in the time-base direction of the reproduced signal is increased and the erasing rate is deteriorated. Thus, there arise some problems when realizing a high linear velocity and high density recording, in particular, when introducing the mark edge type recording method.

In order to avoid the problems, it is necessary to equalize the optical information sensitivity of the amorphous region and that of the crystalline region. It is therefore necessary that the difference in light absorptance, $\Delta A = A_{cry} - A_{amo}$, is great so that the latent heat of melting can be compensated, where the absorptance in the crystalline region is $A_{cry}$, and that in the amorphous region is $A_{amo}$. Moreover, in order to obtain a sufficient C/N ratio, it is desired that the difference in reflectance, $\Delta R = R_{cry} - R_{amo}$) is also great, where the reflectance in the crystalline region is $R_{cry}$ and that in the amorphous region is $R_{amo}$ (Publication of Japanese Patent Applications (Tokkai Hei) No.5-298747, (Tokkai Hei) No. 5-298748). Herein, the absoptance and the reflectance are evaluated with laser beams having the same wavelength $\lambda$.

However, in a case where the incident light hardly transmit to the side opposite to the substrate because the reflectance of the reflective layer is high or the recording layer is too thick, the total of the difference of the optical absorption $\Delta A$ and the difference of the reflectance $\Delta R$ is almost 0. As a result, the above conditions cannot be satisfied. Therefore, a material and structure in which light beams appropriately transmit are needed. A three-layer structure comprising a recording layer, and first and second dielectric layers provided respectively on the upper and lower sides of the recording layer without a reflecting layer (Publication of Japanese Patent Application (Tokkai Hei) No.3-113844, Tokkai Hei No. 5-298748); and a four-layer structure further comprising a reflective layer using a material of the low reflectance or a reflective layer having the sufficiently small film thickness (Publication of Japanese Patent Applications (Tokkai Hei) No.4-102243 and (Tokkai Hei) No. 5-298747) are suggested. However, if both the difference $\Delta A$ and $\Delta R$ are increased, a great amount of incident light is required to be transmitted, thus a reducing the degree of freedom in optical designing.

One possible solution is to increase the absolute value of the reflectance difference $\Delta R$ in the region of $\Delta R<0$ not $\Delta R>0$, namely, the region of the reflectance increasing type medium. With this structure, a sufficient CIN ratio can be obtained, and the difference of the optical absorption rate $\Delta A$ easily can be increased. Thus, the degree of freedom in optical designing can be enhanced. Actually, the method is suggested in which the absolute value of the reflectance difference $\Delta R$ is increased in the region of the reflectance increasing type medium by providing an optical absorption layer comprising a metal etc. on the substrate side of the recording layer (Publication of Japanese Patent Applications (Tokkai Hei) No. 7-78354, (Tokkai Hei) No. 7-105574).

Moreover, most of the write once type recording media are reflectance increasing type medium. The write once type recording media are useful for storing information and can be manufactured at a low cost. But, unlike the rewritable type recording medium, the write once type recording medium cannot erase and correct information. One of main recording methods of the write once type recording medium, therefore, is forming recording marks by crystallizing the recording layer in its amorphous state, that is, the state where films are formed, is irradiated with a laser beam. In general, in a case where a medium does not comprise layers other than the recording layer, the reflectance is higher in a crystalline state rather than in an amorphous state, and a reflectance increasing type recording medium is formed. The write once type recording medium can record only once. However, it can be manufactured at a low cost because it has a single layer structure and dose not require the initialization. Furthermore, since it uses irreversible change, it is excellent in information storage.

As mentioned above, it is necessary for the reflectance increasing type recording medium to increase both the reflectance before recording and that after recording. Thus, it is disadvantageous in reducing the crosstalk, but can be applied in the rewritable type recording medium or the write once type recording medium. In the rewritable type recording medium, the distortion of the shape of the recording mark at the time of overwriting is reduced by making the absorption rate of the crystalline state greater than that of the amorphous state. In the write once type recording medium, initialization is not required. In view of such circumstances, it has been desired that the reflectance increasing type medium come into practice.

SUMMARY OF THE INVENTION

It is therefore an object of the present invention to provide a reflectance increasing type optical information recording medium capable of recording and reproducing information at high density and of reducing crosstalk in the land & groove recording, and a method for recording and reproducing information by using the optical information recording medium.

In order to achieve the above mentioned object, the present invention provides an optical information recording medium comprising a substrate that has a groove for guiding light beams and a recording layer in which a reflectance changes by irradiation with light beams. The depth D of the groove for guiding light beams is in the range of $\lambda/8n$ to $3\lambda/8n$, where a wavelength of the light beams is $\lambda$ and a refractive index of the substrate is n. The reflectance after recording is greater than the reflectance before recording.

The difference $\Delta\phi=\phi_1-\phi_0$ between the phase $\phi_1$ of the reflected light after recording and the phase $\phi_0$ of the reflected light before recording is in the range of $(-0.1+2\,m)\pi$ to $(0.1+2\,m)\pi$, where m is an integer.

With such an optical information recording medium, the value of the crosstalk is 27 dB or more and the deterioration of the quality of the reproduced signal due to the effect of the recording mark of the adjacent tracks can sufficiently be inhibited. Thus, the high density reflectance increasing type recording medium capable of reducing crosstalk can be obtained.

According to another aspect, the present invention provides a method for recording and reproducing information with light beams and an optical information recording medium. The optical information recording medium comprises a substrate having a groove for guiding light beams and a recording layer in which a reflectance changes by irradiation with light beams. The reflectance of the light beams after recording is greater than the reflectance before recording. The depth of the groove for guiding light beams is in the range of $\lambda/8n$ to $3\lambda/8n$, where a wavelength of the light beams is $\lambda$ and a refractive index of the substrate is n. The difference, $\Delta\phi=\phi_1-\phi_0$, between the phase $\phi_1$ of the reflected light beams after recording and the phase $\phi_0$ of the reflected light beams before recording is in the range of $(-0.1+2\,m)\pi$ to $(0.1+2\,m)\pi$, where m is an integer.

With such a recording and reproducing method, the value of the crosstalk is 27 dB or more and the deterioration of the quality of the reproduced signal due to the effect of the recording mark of the adjacent tracks can be inhibited sufficiently. Thus, the high density reflectance increasing type recording medium capable of reducing crosstalk can be obtained.

DETAILED DESCRIPTION OF THE INVENTION

In one embodiment of the present invention, it is preferable that the depth D of the groove for guiding light beams is in the range of $\lambda/7n$ to $\lambda/5n$, or in the range of $3\lambda/10n$ to $5\lambda/14n$. Furthermore, it is preferable that $\Delta\phi=\phi_1-\phi_0$ is in the range of $(-0.05+2\,m)\pi$ to $(0.05+2\,m)\pi$, where m is an integer. Thus, the value of the crosstalk can be 30 dB or more.

In another embodiment of the present invention, it is preferable that the recording layer comprises a phase change material that changes between an amorphous state and a crystalline state. Thus, the recording marks can be formed by changing the reflectance of the recording layer by irradiation with light beams. It is further preferable that the phase change material before recording is in a crystalline state, the phase change material after recording is in an amorphous state, and the change in the reflectance is a reversible process. Thus, an optical information recording medium that is a rewritable type and reflectance increasing type recording medium can be obtained. It is still further preferable that the phase change material before recording is in an amorphous state, the phase change material after recording is in a crystalline state, and the change in the reflectance is an irreversible process. Thus, an optical information recording medium that is a write once type medium and that does not require the initialization process can be obtained. It is still further preferable that the recording layer comprises an oxide of an element selected from a metal element, a semimetal element and a semiconductor element, and the oxidation number of the oxide is smaller than the oxidation number defined by the stoichiometry. As the semimetal element, Te is preferred. In this case, it is preferable that Pd is added to the material constituting the recording layer. Thus, the crystallization can be promoted and completed within several tens of microseconds (one rotation of disc). Consequently, a practical recording medium can be obtained.

In further embodiment of the present invention, the thickness of the recording layer is in the range of 5 nm to 70 nm.

According to the method for recording and reproducing information by using the optical information recording medium of the present invention, it is preferable that the depth D of the groove for guiding light beams is in the range of $\lambda/7n$ to $\lambda/5n$, or in the range of $3\lambda/10n$ to $5\lambda/14n$. It is further preferable that the difference $\Delta\phi=\phi_1-\phi_0$ is in the range of $(-0.05+2\,m)\pi$ to $(0.05+2\,m)\pi$, where m is an integer. Thus, the value of the crosstalk can be made 30 dB or more.

Hereinafter, the present invention will be described with reference to drawings.

Figure 1:
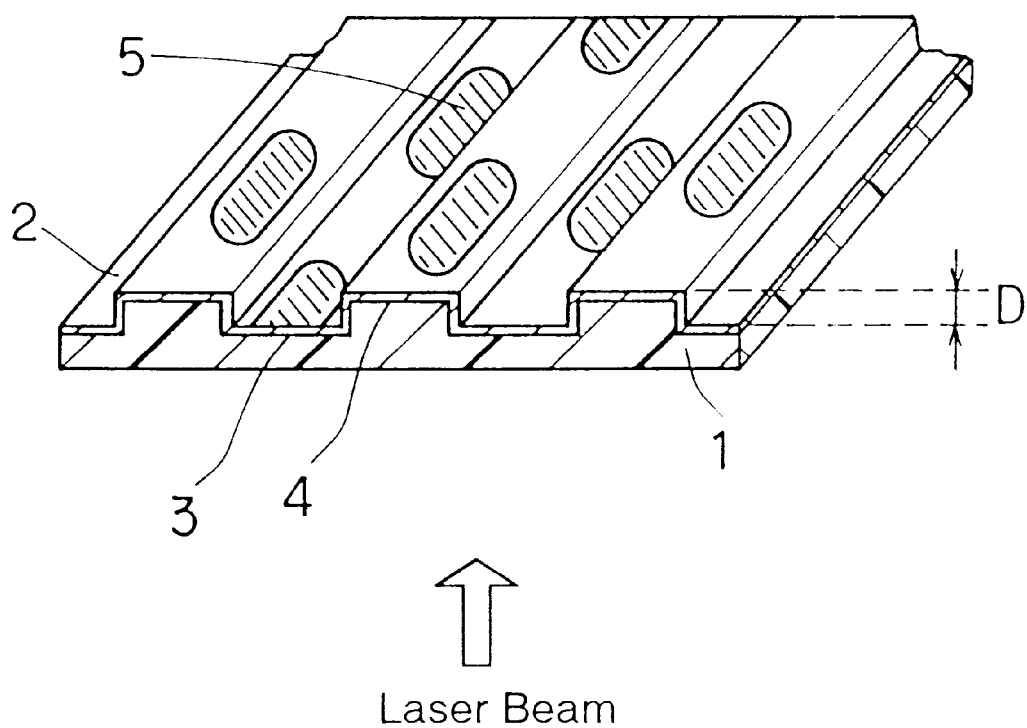
FIG. 1 is a partially perspective view of an optical information recording medium of the present invention.

FIG. 1 is a partial perspective view of an optical information recording medium of the present invention. As shown in FIG. 1, a transparent substrate 1 comprises a groove 3 of the depth D and a land 4 provided between the adjacent grooves 3, 3. A recording layer 2 is laminated on the transparent substrate 1. In this case, a recording mark 5 is formed both on the groove 3 and on the land 4 (land & groove recording).

As a material of the transparent substrate 1, polycarbonate resin, polymethyl metacrylate resin, polyolefin resin, glass or the like can be used. Moreover, the thickness of the transparent substrate 1 is not particularly limited, but the thickness of about 0.3 mm to 1.5 mm is preferred.

The recording layer 2 is formed by a general vapor phase thin film depositing method such as a vacuum evaporation method, a sputtering method, an ion plating method, a CVD (chemical vapor deposition) method, an MBE (molecular beam epitaxy) method, and the like.

As a material of the recording layer 2, a phase change material that changes between a crystalline state and an amorphous state is preferably used. If the phase change material is used for the material of the recording layer 2, the recording mark 5 can be formed by changing the reflectance of the recording layer 2 by irradiation with laser beams.

In this case, it is further preferable that the recording layer 2 before recording is in a crystalline state and the recording layer after recording is in an amorphous state and the change in the reflectance is a reversible process. Thus, the optical information recording medium that is a rewritable type and reflectance increasing type recording medium can be obtained.

In this case, it is also preferable that the state of the recording layer before recording is an amorphous state, the recording layer after recording is in a crystalline state and the change in the reflectance is an irreversible process. Thus, an optical information recording medium that is a write once type and that does not require the initialization process can be realized.

In this case, it is further preferable that the material constituting the recording layer 2 is an oxide of an element selected from a metal element, a semimetal element and a semiconductor element, and the oxidation number of the oxide is smaller than that defined by the stoichiometry (hereinafter, such an oxide will be referred to as a "nonstoichiometric oxide").

In this case, it is preferable that a metal element such as In, Mo, etc., a semimetal element such as Te, Sb, etc., and a semiconductor element such as Ge, Si, etc., are used.

A material of the recording layer is not particularly limited, but chalcogenide comprising Te or Se as a base material may be used besides the following examples. Specifically, the material preferably includes an alloy containing Ge—Sb—Te, Ge—Te, Pd—Ge—Sb—Te, In—Sb—Te, Sb—Te, Ag—In—Sb—Te, Ge—Sb—Bi—Te, Ge—Sb—Se—Te, Ge—Sn—Te, Ge—Sn—Te—Au, Ge—Sb—Te—Cr, In—Se, In—Se—Co as a main component, or an alloy in which oxygen, nitrogen, carbon, etc. are added to the above mentioned alloy.

Tellurium is useful for forming small recording marks by laser heating because it has an appropriately low melting point and low thermal conductivity. In tellurium, an optical constant in the region of red wavelength largely changes accompanied by the formation of recording marks. However, a simple substance of tellurium has inferior oxidization resistance. In this case, the oxidization resistance can be improved by forming a nonstoichiometric oxide $TeO_x$ ($0<x<2$) where tellurium is dispersed in a $TeO_2$ matrix.

Moreover, it takes a few minutes for the nonstoichiometric oxide $TeO_x$ ($0<x<2$) to sufficiently make the recording mark great (in other word, to complete the crystallization). Therefore, $TeO_x$ is not suitable for a practical recording medium. However, by adding the third element such as Pd, the crystallization can be promoted and completed within several tens of microseconds (one rotation of the disc). Thus, a practical optical information recording medium can be obtained.

The thickness of the recording layer 2 is not particularly limited, but preferably is in the range of 5 nm to 70 nm.

Furthermore, the optical information recording medium of the present invention may be in the form of a single substrate disc by overcoating with ultraviolet hardening resin and also may be in the form of a double-sided disc by adhering a pair of the single substrate discs with ultraviolet hardening resin or hot melt resin.

Furthermore, the optical information recording medium of the present invention preferably comprises a dielectric protective layer so as to adjust the reflectance, absorption rate and phase of the reflected light and to inhibit the increase of noise due to thermal damages to the thin film of the recording layer. For example, a mixed material of $ZnS-SiO_2$ can be used for the dielectric protective layer. The dielectric protective layer may be provided on the side of the transparent substrate 1 and/or the side opposite to the transparent substrate 1 of the recording layer 2.

Furthermore, the optical information recording medium of the present invention preferably comprises a reflective layer and /or an absorption layer that contains a metal such as Au, Al, etc., a semimetal, a semiconductor or an alloy material thereof as a base material so as to adjust the reflectance, absorption rate and phase of the reflected light and to reduce the thermal load of the thin film of the recording layer. The layers may be provided on the side of the transparent substrate 1 and/or the side opposite to the transparent substrate 1 of the recording layer 2.

Figure 2:
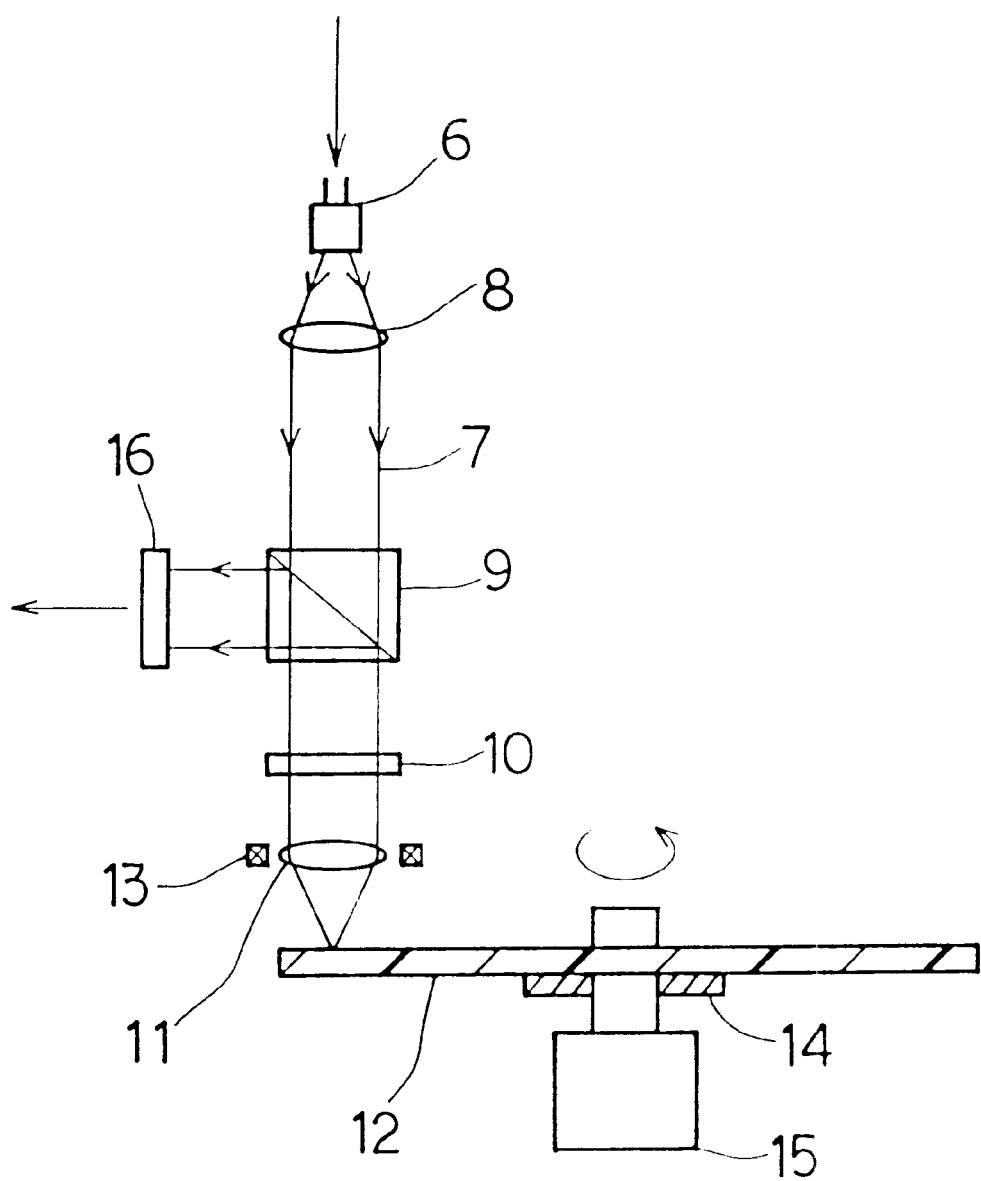
FIG. 2 is a schematic view showing a recording and reproducing apparatus of the optical information recording medium of the present invention.

FIG. 2 is a schematic view showing a recording and reproducing apparatus of the optical information recording medium. As shown in FIG. 2, laser beams 7 emitted from a semiconductor laser diode 6 are converged with a collimating lens 8 to form parallel rays. The parallel rays are converged on an optical disc 12 by way of a beam splitter 9, a plate of ¼ wavelength 10 and an objective lens 11. In this case, the parallel rays are focused by moving the object lens 11 up and down by using a voice coil 13. The optical disc 12 is fixed on a turntable 14. The turntable 14 is rotated by a motor 15. The information signals are recorded and reproduced on the optical disc 12 rotating on the turntable 14 by irradiating the optical disc 12 with laser beams 7.

When information signals are recorded, the strength of the laser beams 7 is fluctuated between the power level $P_1$ and $P_2$ or $P_3$ (where $P_1>P_2 \geq P_3$) $P_1$ is a power level that is sufficient so as to change the phase of the irradiated region even if the laser beams irradiate while modulating; and $P_2$ and $P_3$ are power levels that can not change the phase of the irradiated region even if the laser beams irradiate without modulating.

The recording mark is recorded by using a pulse having a pulse width corresponding to the length of the recording mark to be recorded and the power level $P_1$. This pulse may be a single rectangle-shaped pulse and may be a recording pulse column comprising a plurality of pulses that are fluctuated between the power level $P_1$ and the power level $P_2$ or $P_3$. When no recording mark is formed, the laser beams are kept constant at the power level $P_2$.

When the information signals are reproduced, like in the case of recording, the successive light beams having the above mentioned reproducing power $P_3$ are irradiated on the optical disc 12, and its reflected light is incident on a detector 16. Thus, the change in the reflected light is detected as a reproduced signal.

First Embodiment

A transparent substrate 1 comprises a polycarbonate resin having a refractive constant of 1.6 (wavelength λ=680 nm) and a thickness of 0.6 mm. In the substrate 1, the widths of a groove 3 and a land 4 were 0.74 μm, respectively. The depth D of the groove 3 was about 72 nm, approximately corresponding to λ/6 n. On the transparent substrate 1, an absorption layer of Au, a lower dielectric layer of ZnS—$SiO_2$ (the ratio of the number of the molecules of ZnS:$SiO_2$=80:20), a recording layer Ge—Sb—Te (the ratio of the number of atoms of Ge:Sb:Te=22:25:53), an upper dielectric layer ZnS—$SiO_2$ (the ratio of the number of molecules of ZnS: $SiO_2$=80:20), and a reflective layer Al—Cr (the ratio of the number of atoms of Al:Cr=97:3) were formed in this order by sputtering. Then, the layered film was overcoated with an ultraviolet hardening resin, followed by annealing with laser beams to manufacture single plate discs No. 1 to 10 in which the entire surfaces were initially crystallized. All of these discs were the reflectance increasing type recording media. Their film thicknesses were changed so as to evaluate the dependency of the crosstalk on the phase difference with recording.

The following table 1 shows the values of the film thickness of each layer of each disc, the reflectance $R_0$ before recording (a crystalline state), the reflectance $R_1$ after recording (an amorphous state), and the phase difference, $\Delta\phi=\phi_1-\phi_0$, between the phase $\phi_1$ of the reflected light after recording and the phase $\phi_0$ of the reflected light before recording. The reflectance and phase difference were calculated by the optical measurement when the wavelength λ was set to be 680 nm. The complex refractive indices used for the optical calculation were: 0.3−i4.0 for the absorption layer, 2.1−i0.0 for the dielectric layer, 4.6−i3.5 for the recording layer (in a crystalline state) and 4.3−i1.7 for the recording layer (in an amorphous state), and 1.9−i6.2 for the reflective layer.

Mark edge recording was conducted on these discs by using an optical system having a wavelength λ of 680 nm and numerical aperture NA of 0.6 under conditions of the linear velocity of 6 m/sec (the distance from the disc center: about 32 mm, the rotation rate: 1800 rpm) and then the crosstalk was measured as follows. First, signals of 9.7 MHz were recorded on the two adjacent grooves 3, 3. One of the tracks was reproduced. Then, an amplitude $A_0$ of the signal of 9.7 MHz was measured by using a spectrum analyzer. Next, a signal of 2.6 MHz was recorded on the land 4 between two adjacent grooves 3, 3. The track was reproduced. Then, an amplitude $A_1$ of the signal of 9.7 MHz was measured by a spectrum analyzer. The absolute value of the difference, $A_1-A_0$, between the thus measured signal amplitudes $A_1$ and $A_0$ was made to be the value of the crosstalk from the groove 3 to the land 4. The same process was conducted by reversing the land 4 and groove 3 to measure the value of the crosstalk from the land 4 to the groove 3.

The following table 1 shows the measured value of the crosstalk of each disc (inferior crosstalk in the crosstalk from the groove 3 to the land 4 and the crosstalk from the land 4 to the groove 3). In general, if the value of the crosstalk is 30 dB or more, the deterioration of the quality of the reproduced signal due to the effect of the recording mark of the adjacent tracks is sufficiently small.

Moreover, the recording power $P_1$ in recording signals was 1.5 times greater than the lower limit of the power having the C/N ratio of more than 45 dB when the signal of 9.7 MHz was recorded. The erasing power $P_2$ was a medium value of the power having an erasing ratio, namely, a damping ratio of the signal of 9.7 MHz, of more than 25 dB when the signal of 2.6 MHz was overwritten on the recorded signal of 9.7 MHz. The reproducing power $P_3$ was set to be 1 mW.

Figure 3:
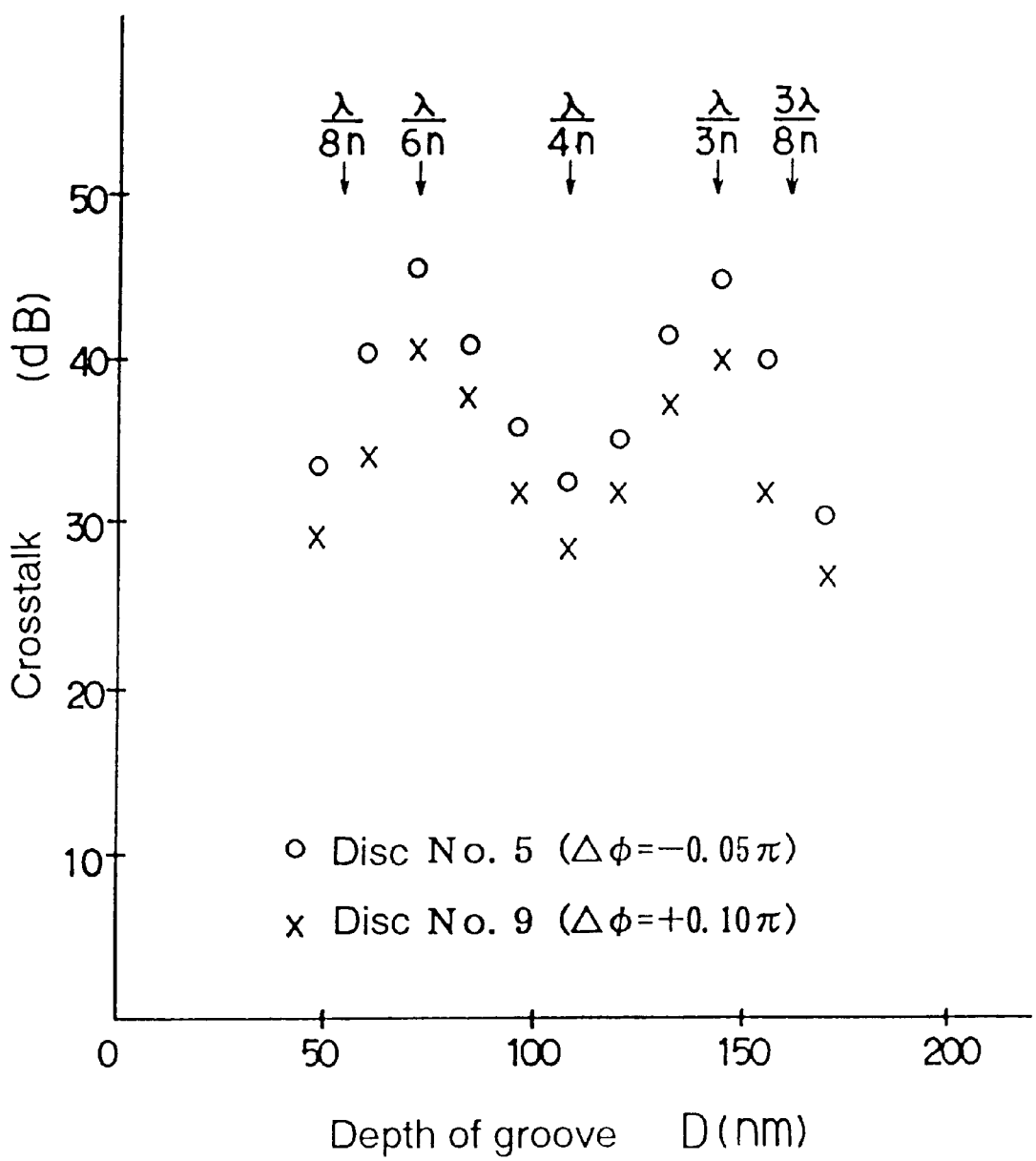
FIG. 3 is a graph showing the dependency of the crosstalk of each disc on the phase difference according to an embodiment of the present invention.

FIG. 3 shows: in the discs of No. 5 (the phase difference: −0.05 π), the value of the crosstalk was 30 dB or more when the depth D of the groove 3 was in the range of λ/8n and 3 λ/8n; and in the discs of No. 9 (the phase difference: +0.10 π), the value of the crosstalk was 30dB or more when the depth D of the groove 3 was in the range of λ/7n to λ/5n and in the range of 3 λ/10n to 5 λ/14n. Moreover, in all discs, the values of the crosstalk were 27dB or more.

From the above, the value of the crosstalk is 27dB or more when the depth D of the groove 3 is in the range of λ/8n to 3 λ/8n and the phase difference is in the range of (−0.1+2 m) π to (0.1+2 m) π, where m is an integer. In particular, the value of the crosstalk is 30dB or more when the depth D of the groove 3 is in the range of λ/8n to 3 λ/8n, and the phase difference is in the range of (−0.05+2 m) π to (0.05+2 m) π, where m is an integer. Thus, the deterioration of the quality of the reproduced signal due to the effect of the recording mark from the adjacent tracks can be inhibited sufficiently. Moreover, the value of the crosstalk is 30 dB or more when the depth D of the groove 3 is in the range of λ/7n to λ/5n, or in the range of 3 λ/10n to 5 λ/14n, and the phase difference is in the range of (−0.1+2 m) π to (0.1+2 m) π, where m is an integer. Thus, the deterioration of the quality of the reproduced signal due to the effect of the recording mark from the adjacent tracks can be inhibited sufficiently.

Second Embodiment

A transparent substrate 1 comprising a polycarbonate resin having a refractive constant of 1.6 (wavelength λ=680nm) and a thickness of 0.6 mm. In the substrate 1, the widths of a groove 3 and a land 4 were 0.74 μm, respectively. The depth D of the groove 3 is about 72 nm, which approximately corresponds to λ/6n. A recording layer 2 comprising Te, O and Pd was formed by sputtering on the transparent substrate 1. The recording layer 2 was formed in an atmosphere of sputter gases including Ar and $O_2$ by using a mixed material target of Te—Pd (the ratio of the number of atoms of Te:Pd=90:10). In this case, it is preferable that the film thickness of the recording is in the range of 20 nm to 70 nm. layer The single plate discs No. 1 to 6 onto which an ultraviolet hardening resin was overcoated were manufactured. Since these discs were formed by changing only the sputtering periods without changing the other sputtering conditions, all of them had the same compositions and only their film thicknesses were different. This composition was subjected to a quantitative elemental analysis by Auger electron spectroscopy (AES). As a result, the ratio of atomic number of Te:O:Pd was 42:46:12.

TABLE 1

| | | Film thickness of each layer (nm) | | | | Reflectance | | Phase difference (π) | Crosstalk (dB) |
|---|---|---|---|---|---|---|---|---|---|
| No. | Au | ZnS—SiO$_2$ | Ge—Sb—Te | ZnS—SiO$_2$ | Al—Cr | Before recording (%) | After recording (%) | | |
| 1 | — | 60 | 15 | 90 | 150 | 19 | 35 | −0.14 | 26 |
| 2 | — | 60 | 15 | 100 | 150 | 25 | 42 | −0.10 | 33 |
| 3 | — | 60 | 15 | 110 | 150 | 34 | 51 | −0.06 | 42 |
| 4 | — | 80 | 15 | 110 | 150 | 28 | 45 | −0.08 | 37 |
| 5 | — | 60 | 12 | 110 | 150 | 32 | 51 | −0.05 | 46 |
| 6 | — | 70 | 12 | 100 | 150 | 19 | 38 | −0.10 | 36 |
| 7 | — | 80 | 12 | 90 | 150 | 10 | 27 | −0.17 | 29 |
| 8 | 10 | 100 | 12 | 50 | 150 | 11 | 32 | −0.05 | 44 |
| 9 | 10 | 110 | 12 | 80 | 150 | 10 | 29 | +0.10 | 41 |
| 10 | 10 | 120 | 12 | 30 | 150 | 10 | 26 | +0.16 | 28 |

Table 1 shows that in discs having the phase difference in the range of −0.1π to +0.1π, the crosstalk is 30 dB or more. In other discs, the crosstalk is not more than 30 dB; and the smaller the absolute value of the phase difference is, the more efficiently the crosstalk can be inhibited.

Next, the discs No. 5 and No. 9 were manufactured by using 11 kinds of substrates in which only the depths D of the groove 3 were changed. The crosstalk was measured by the method as the above. The results are shown in FIG. 3.

The following table 2 shows the values of the film thickness of each layer of each disc, the reflectance $R_0$ before recording (a crystalline state), the reflectance $R_1$ after recording (an amorphous state), and the phase difference, $\Delta\phi=\phi_1-\phi_0$, between the phase $\phi_1$ of the reflected light after recording and the phase $\phi_0$ of the reflected light before recording. The reflectance and phase difference were measured by the optical measurement when the wavelength $\lambda$ was set to be 680 nm. The complex refractive indices of the recording layer used for the optical measurement were: 3.3−i1.1 (in a crystalline state) and 2.6−i0.6 (in an amorphous state).

Mark edge recording was conducted on these discs by using an optical system having a wavelength $\lambda$ of 680 nm and numerical aperture NA of 0.6 under conditions of the linear velocity of 6 m/sec (the distance from the disc center: about 32 mm, the rotation rate: 1800 rpm) and then the crosstalk was measured as follows. First, signals of 9.7 MHz were recorded on the two adjacent grooves 3, 3. One of the tracks was reproduced. Then, an amplitude $A_0$ of the signal of 9.7 MHz was measured by using a spectrum analyzer. Next, a signal of 2.6 MHz was recorded on the land 4 between two adjacent grooves 3, 3. The track was reproduced. Then, an amplitude Al of the signal of 9.7 MHz was measured by a spectrum analyzer. The absolute value of the difference, $A_1-A_0$, between the thus measured signal amplitudes $A_1$ and $A_0$ was made to be the value of the crosstalk from the groove 3 to the land 4. The same process was conducted by reversing the land 4 and groove 3 to measure the value of the crosstalk from the land 4 to the groove 3. The following table 2 shows the measured value of the crosstalk of each disc (inferior crosstalk in the crosstalk from the groove 3 to the land 4 and the crosstalk in the land 4 to the groove 3).

Moreover, the recording power $P_1$ when recording signals was 1.5 times greater than the lower limit of the power having the C/N ratio of more than 45 dB when a signal of 9.7 MHz was recorded. The medium power $P_2$ was set to be 3 mV, and the reproducing power $P_3$ was set to be 1 mW.

TABLE 2

| No. | Film thickness of Te—O—Pd (nm) | Reflectance (%) Before recording | Reflectance (%) After recording | Phase difference ($\pi$) | Crosstalk (dB) |
|---|---|---|---|---|---|
| 1 | 20 | 8 | 18 | −0.06 | 38 |
| 2 | 30 | 12 | 26 | −0.05 | 37 |
| 3 | 40 | 15 | 32 | −0.04 | 40 |
| 4 | 50 | 18 | 34 | −0.03 | 40 |
| 5 | 60 | 20 | 34 | −0.01 | 43 |
| 6 | 70 | 18 | 30 | +0.01 | 43 |

As shown in Table 2, in every disc, the phase difference is in the range of $-0.1\pi$ to $+0.1\pi$ and the crosstalk is 30 dB or more. Thus, the deterioration of the quality of the reproduced signals due to the effect of the recording marks of the adjacent tracks can be inhibited sufficiently.

Finally, it is understood that the invention may be embodied in other specific forms without departing from the spirit or essential characteristics thereof. The embodiments disclosed in this application are to be considered in all respects as illustrative and not restrictive, so that the scope of the invention being indicated by the appended claims rather than by the foregoing description, and all changes which come within the meaning and range of equivalency of the claims are intended to be embraced therein.

What is claimed is:

1. An optical information recording medium comprising: a substrate having a groove for guiding light beams and a recording layer in which a reflectance changes by irradiation with said light beams, wherein the depth of said groove for guiding light beams is in the range of $\lambda/8n$ to $3\lambda/8n$, where $\lambda$ is a wavelength of said light beams and n is a refractive index of said substrate; the reflectance after recording is greater than the reflectance before recording; and the phase difference, $\Delta\phi=\phi_1-\phi_0$, between the phase $\phi_1$ of the reflected light after recording and the phase $\phi_0$ of the reflected light before recording is between $(-0.1+2\,m)\pi$ and $(0.1+2\,m)\pi$, where m is an integer having an absolute value that is greater or equal to one.

2. The optical information recording medium according to claim 1, wherein the phase difference, $\Delta\phi=\phi_1-\phi_0$, is in the range of $(-0.05+2\,m)\,\pi$ to $(0.05+2\,m)\,\pi$, where m is an integer that is equal to or greater than one.

3. The optical information recording medium according to claim 1, wherein the depth of the groove is in the range selected from the group consisting of the range of $\lambda/7n$ to $\lambda/5n$ and the range of $3\lambda/10n$ to $5\,\lambda/14n$.

4. The optical information recording medium according to claim 1, wherein the recording layer comprises a phase change material that changes between an amorphous state and a crystalline state.

5. The optical information recording medium according to claim 4, wherein the phase change material before recording is in a crystalline state, the phase change material after recording is in an amorphous state, and the change in reflectance with the phase change is reversible.

6. The optical information recording medium according to claim 4, wherein the phase change material before recording is in an amorphous state, the phase change material after recording is in a crystalline state, and the change in reflectance with the phase change is irreversible.

7. The optical information recording medium according to claim 4, wherein the recording layer comprises an oxide of an element selected from the group consisting of a metal element, a semimetal element and a semiconductor element, and the oxidation number of said oxide is smaller than the oxidation number defined by the stoichiometry.

8. The optical information recording medium according to claim 4, wherein the phase change material comprises Te.

9. The optical information recording medium according to claim 8, wherein Pd is added to the recording layer.

10. The optical information recording medium according to claim 1, wherein the thickness of the recording layer is in the range of 5 nm to 70 nm.

11. A method for recording and reproducing information with light beams and an optical information recording medium, the optical information recording medium comprising a substrate having a groove for guiding light beams and a recording layer in which a reflectance changes by irradiation with said light beams; wherein the reflectance of the light beams after recording is greater than the reflectance of the light beams before recording; the depth of said groove for guiding light beams is in the range of $\lambda/8n$ to $3\lambda/8n$, where $\lambda$ is a wavelength of said light beams and n is a refractive index of said substrate; the reflectance after recording is greater than the reflectance before recording;

the method comprising selecting a phase difference, $\Delta\phi=\phi_1-\phi_0$, between the phase $\phi_1$ of the reflected light after recording and the phase $\phi_0$ of the reflected light before recording that is sufficient to inhibit crosstalk and that is between $(-0.1+2\,m)\pi$ and $(0.1+2\,m)\pi$, where m is an integer having an absolute value that is greater or equal to one.

12. The method according to claim 11, wherein the phase difference, $\Delta\phi=\phi_1-\phi_0$, is in the range of $(-0.05+2\text{ m})\pi$ to $(0.05+2\text{ m})\pi$, where m is an integer that is equal to or greater than one.

13. The method according to claim 11, wherein the depth of the groove is in the range selected from the group consisting of the range of $\lambda/7n$ to $\lambda/5n$ and the range of $3\lambda/10n$ to $5\lambda/14n$.

14. The optical information medium according to claim 1, wherein the substrate has a land, and a width of the groove and a width of the land are about the same.

15. An optical information recording medium comprising: a substrate having a groove for guiding light beams and a recording layer in which a reflectance changes by irradiation with said light beams, wherein the depth of said groove for guiding light beams is in the range of $\lambda/8n$ to $3\lambda/8n$, where $\lambda$ is a wavelength of said ligth beams and n is a refractive index of said substrate; the reflectance after recording is greater than the reflectance before recording; and the phase difference, $\Delta\phi=\phi_1-\phi_0$, between the phase $\phi_1$ of the reflected light after recording and the phase $\phi_0$ of the reflected light before recording is equal to zero.

16. The optical information recording medium according to claim 15, wherein the depth of the groove is in the range selected from the group consisting of the range of $\lambda/7n$ to $\lambda/5n$ and the range of $3\lambda/10n$ to $5\lambda/14n$.

17. The optical information recording medium according to claim 1, wherein the recording layer comprises a phase change meterial that changes between an amorphous state and a crystalline state.

18. The optical recording medium according to claim 17, wherein the phase change material before recording is in a crystalline state, the phase change material after recording is in an amorphous state, and the change in reflectance with the phase change is reversible.

19. The optical recording medium according to claim 17, wherein the phase change material is in an amorphous state, the phase change material after recording is in a crystalline state, and the change in reflectance with the phase change is irreversible.

20. The optical recording medium according to claim 17, wherein the recording layer comprises an oxide of an element selected from the group consisting of a metal element, a semimetal element and a semiconductor element, and the oxidation number of said oxide is smaller than the oxidation number defined by the stoicbiometry.

21. The optical recording medium according to claim 17, wherein the phase change material comprises Te.

22. The optical recording medium according to claim 21, wherein Pd is added to the recording layer.

23. The optical recording medium according to claim 15, wherein the thickness of the recording layer is in the range of 5 nm to 70 nm.

24. A method for recording and reproducing information with light beams and an optical information recording medium, the optical information recording medium comprising a substrate having a groove for guiding light beams and a recording layer in which a reflectance changes by irradiation with said light beams; wherein the reflectance of the light beams after recording is greater than the reflectance of the light beams before recording; the depth of said groove for guiding light beams is in the range of $\lambda/8n$ to $3\lambda/8n$, where $\lambda$ is a wavelength of said light beams and n is a refractive index of said substrate; the reflectance after recording is greater than the reflectance before recording;

the method comprising selecting a phase difference, $\Delta\phi=\phi_1-\phi_0$, between the phase $\phi_1$ of the reflected light after recording and the phase $\phi_0$ of the reflected light before recording that is sufficient to inhibit crosstalk and that is equal to zero.

25. The method according to claim 24, wherein the depth of the groove is in the range selected from the group consisting of the range of $\lambda/7n$ to $\lambda/5n$ and the range of $3\lambda/10n$ to $5\lambda/14n$.

* * * * *